United States Patent
McCarthy et al.

(10) Patent No.: US 12,086,812 B2
(45) Date of Patent: Sep. 10, 2024

(54) DYNAMIC DEVICE PERFORMANCE EVALUATION

(71) Applicant: Bank of America Corporation, Charlotte, NC (US)

(72) Inventors: Frank H. McCarthy, Boston, MA (US); Gerald C. Davidson, Freedom, ME (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/855,943

(22) Filed: Jul. 1, 2022

(65) Prior Publication Data

US 2024/0005332 A1    Jan. 4, 2024

(51) Int. Cl.
G06Q 20/40    (2012.01)
G06Q 20/32    (2012.01)

(52) U.S. Cl.
CPC ....... *G06Q 20/409* (2013.01); *G06Q 20/3278* (2013.01); *G06Q 20/3267* (2020.05); *G06Q 20/4014* (2013.01)

(58) Field of Classification Search
None
See application file for complete search history.

(56) References Cited

U.S. PATENT DOCUMENTS

| | | | | |
|---|---|---|---|---|
| 6,073,840 A * | 6/2000 | Marion | ...................... | G07F 7/02 235/383 |
| 6,380,853 B1 * | 4/2002 | Long | ......................... | G07F 9/02 340/5.91 |
| 6,690,275 B2 * | 2/2004 | Long | ......................... | G07F 9/02 345/902 |
| 7,080,782 B2 | 7/2006 | Charrin | | |
| 7,565,307 B1 * | 7/2009 | Pinkus | ................. | G06Q 20/382 705/16 |
| 7,640,185 B1 * | 12/2009 | Giordano | ............. | G07G 1/0036 705/1.1 |
| 8,689,012 B1 * | 4/2014 | Bierbaum | ........... | H04W 12/047 705/64 |
| 9,237,465 B1 * | 1/2016 | Tanner | .................... | H04W 4/50 |
| 9,686,026 B1 * | 6/2017 | Reed | ..................... | H04W 24/02 |
| 10,019,699 B2 * | 7/2018 | Reddy | .................. | G02B 6/0088 |
| 10,032,169 B2 | 7/2018 | Essebag et al. | | |
| 10,140,197 B2 * | 11/2018 | Goyet | ................. | G06F 11/2205 |

(Continued)

*Primary Examiner* — Mohammad Z Shaikh
(74) *Attorney, Agent, or Firm* — Banner & Witcoff, Ltd.

(57) ABSTRACT

Arrangements for providing device performance and functionality evaluation are provided. In some aspects, a request to evaluate performance or functionality of a device may be received. The request may be received in a response to failure of a first transaction, made with the payment device, to process. A diagnostic tool may be executed and one or more diagnostic tests may be performed. For instance, an attempt to connect, e.g., via near-field communication, to the payment device may be initiated. If the attempt to connect is not successful, a determination may be made that the payment device is not functioning as expected and a first notification may be generated and transmitted to a user device. If the connection is successful, one or more additional diagnostic tests may be executed to evaluate functionality. If functionality is as expected, a second, different notification may be generated and transmitted to the user.

20 Claims, 16 Drawing Sheets

(56) References Cited

U.S. PATENT DOCUMENTS

| | | | | |
|---|---|---|---|---|
| 10,163,107 B1* | 12/2018 | White | .................. | G06Q 20/341 |
| 10,581,855 B1* | 3/2020 | Donovan | ............... | G06F 3/0488 |
| 10,769,602 B2 | 9/2020 | Kang | | |
| 2006/0106735 A1* | 5/2006 | Bartz | .................... | G07F 7/1008 |
| | | | | 705/75 |
| 2012/0123880 A1* | 5/2012 | Craft | ...................... | G06Q 20/20 |
| | | | | 705/16 |
| 2014/0061305 A1* | 3/2014 | Nahill | .................. | G06K 7/0095 |
| | | | | 235/438 |
| 2015/0105920 A1* | 4/2015 | Carapelli | ............... | G06Q 20/18 |
| | | | | 700/283 |
| 2015/0278803 A1* | 10/2015 | Champaneria | ......... | G06Q 20/20 |
| | | | | 705/17 |
| 2017/0236125 A1* | 8/2017 | Guise | .................... | G06Q 20/20 |
| | | | | 705/17 |
| 2017/0300726 A1* | 10/2017 | Thouin | ............. | G06Q 20/1085 |
| 2018/0240103 A1* | 8/2018 | Rezayee | ............... | G07F 7/0873 |
| 2019/0207953 A1* | 7/2019 | Klawe | .................... | G06F 21/57 |
| 2020/0143214 A1* | 5/2020 | Murphy | ................. | G07F 19/20 |
| 2020/0201703 A1* | 6/2020 | Marquez | ............... | G07G 1/0036 |
| 2020/0387894 A1 | 12/2020 | Shakkarwar | | |
| 2021/0201313 A1* | 7/2021 | Kumawat | ............ | G07F 19/209 |
| 2022/0091949 A1* | 3/2022 | Chen | .................... | G06F 11/261 |

\* cited by examiner

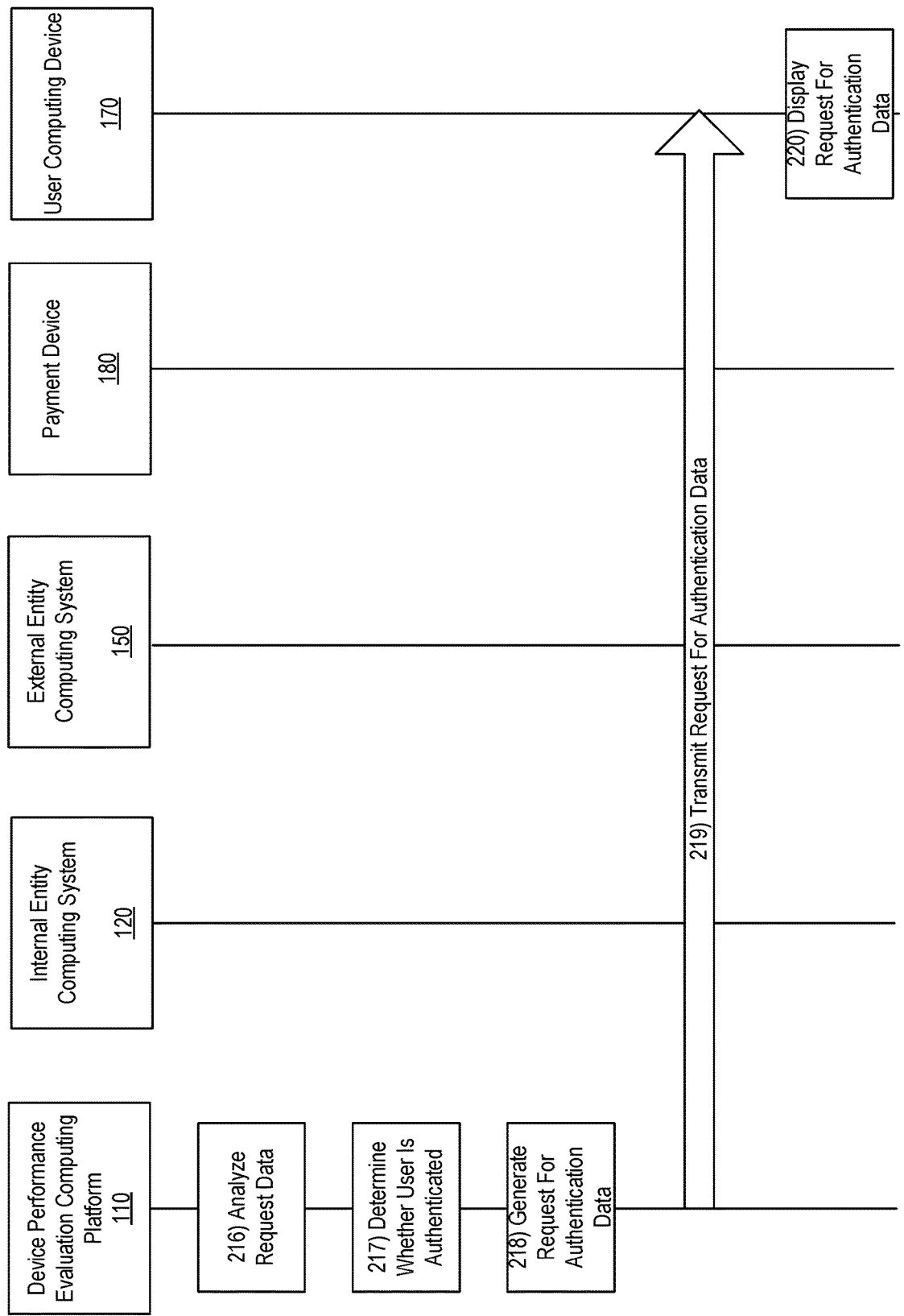

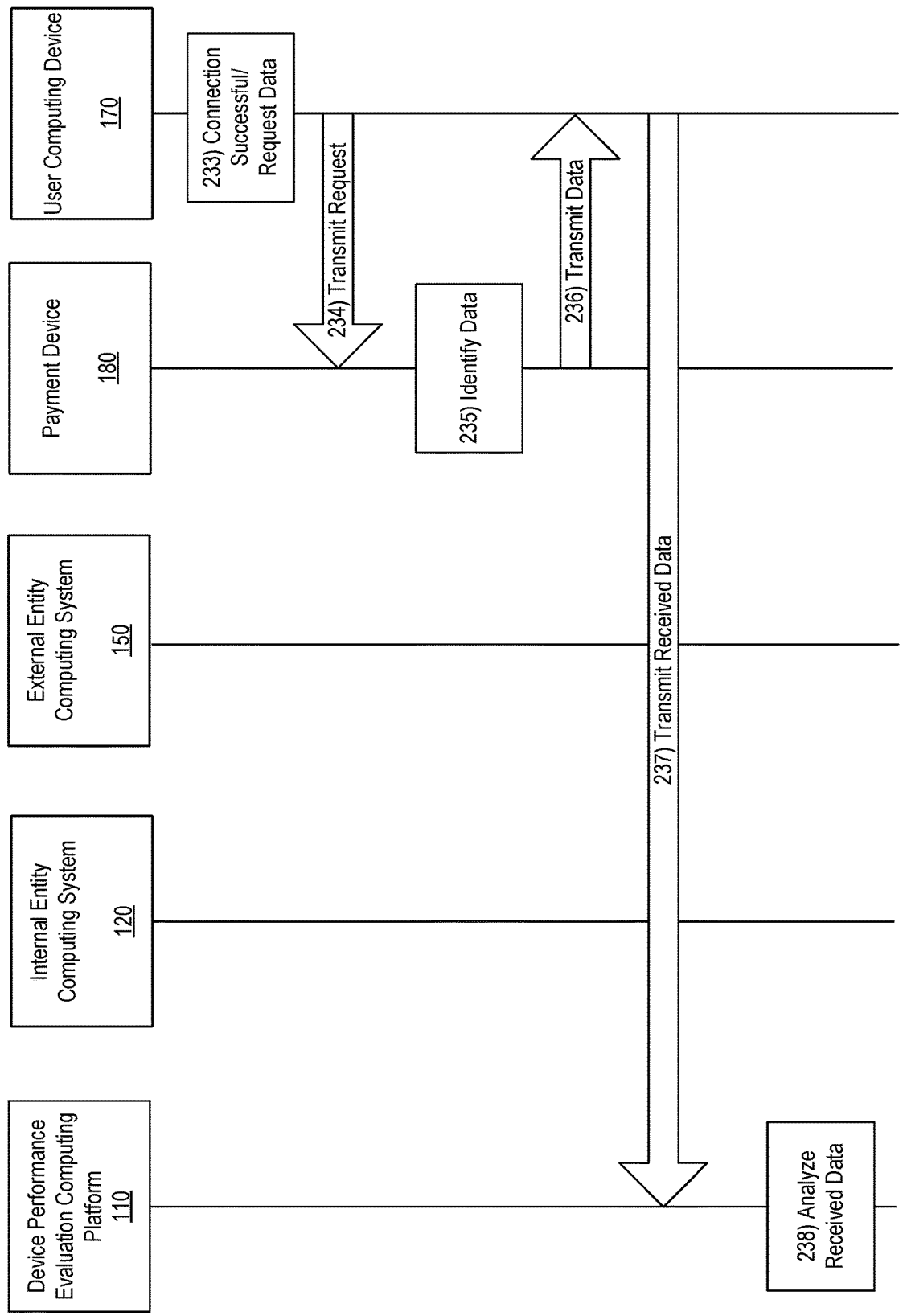

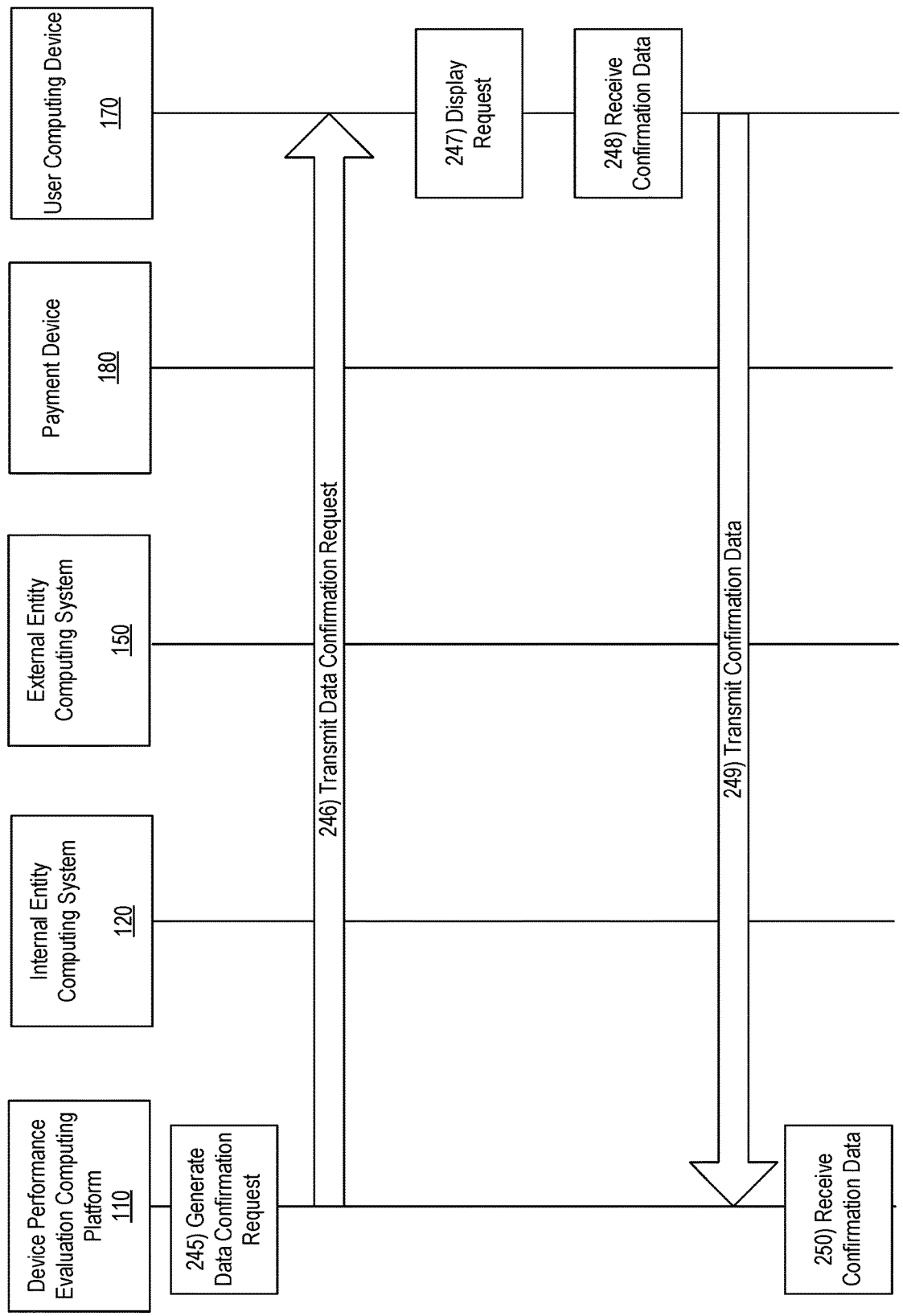

DYNAMIC DEVICE PERFORMANCE EVALUATION

BACKGROUND

Aspects of the disclosure relate to electrical computers, systems, and devices for providing dynamic device performance and functionality evaluation.

Despite various payment options available, consumer use of payment devices, such as debit cards, credit cards, and the like, continues to be extremely common. Accordingly, a failure of a payment device to complete a transaction can be frustrating for users, time consuming and may require resources of an issuing organization to address an issue, replace the payment device, or the like. Often times, failure of a payment device may be due to failure of the point-of-sale system at which the device is being used. However, conventional arrangements do not provide a way for users to evaluate performance or functionality of a payment device and, accordingly, simply assume their payment device is no longer functioning and request a new device from the issuing organization. Accordingly, it would be advantageous to provide dynamic device performance and functionality evaluation functions that may be executed in real-time to enable users to confirm functionality of a payment device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with determining performance or functionality of a payment device.

In some aspects, a request to evaluate performance or functionality of a device may be received. In some examples, the request may be received in a response to failure of a first transaction made with the payment device to process. In response to receiving the request, a requesting user may be authenticated. If the user is authenticated, a diagnostic tool may be executed and one or more diagnostic tests may be performed. For instance, an attempt to connect, e.g., via near-field communication, to the payment device may be initiated. If the attempt to connect is not successful, a determination may be made that the payment device is not functioning as expected and a first notification and recommended action may be generated and transmitted to a user device.

If the connection is successful, one or more additional diagnostic tests may be executed to evaluate functionality. If functionality is as expected, a second notification including a second recommended action may be generated and transmitted to the user. In some examples, the second notification may include a recommendation to attempt a transaction that previously failed at a first entity terminal, at a different entity terminal.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for implementing device performance and functionality evaluation functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, payment devices such as credit cards and debits cards are frequently used to process transactions. Accordingly, when transactions fail to process, a user may assume that it is a failure of the payment device and may contact an issuing organization to obtain a new payment device. Conventional systems to not provide arrangements for confirming functionality of payment devices. Accordingly, issuing organizations may send replacement payment devices that, in many cases, might still be fully functional.

Accordingly, aspects described herein are directed to device performance and functionality evaluation that may be performed in real-time or near real-time. For instance, as a user attempts a transaction using the payment device (e.g., via a point-of-sale system of an entity) if the transaction does not process, a user may request device performance evaluation. In some examples, the request may be made via a mobile application executing on a user computing device and associated with an issuing enterprise organization (e.g., a mobile banking application).

In some examples, the user may request a diagnostic test that may cause a device to attempt to connect, e.g., via near-field communication, to the payment device. If the connection is not successful, the system may determine that the device is no longer functioning as expected and a new payment device may be sent to the user. The user may be notified of the failure of the device and the expected arrival of the new payment device via a first notification.

If the connection is successful, one or more additional diagnostic tests may be performed to determine whether the issue lies with the payment device or the entity point-of-sale system. If the diagnostic tests indicate the payment device if functioning as expected, a second notification may be generated and transmitted to the user recommending that the user attempt the transaction using a different entity point-of-sale system.

These and various other arrangements will be discussed more fully below.

Figure 1A:
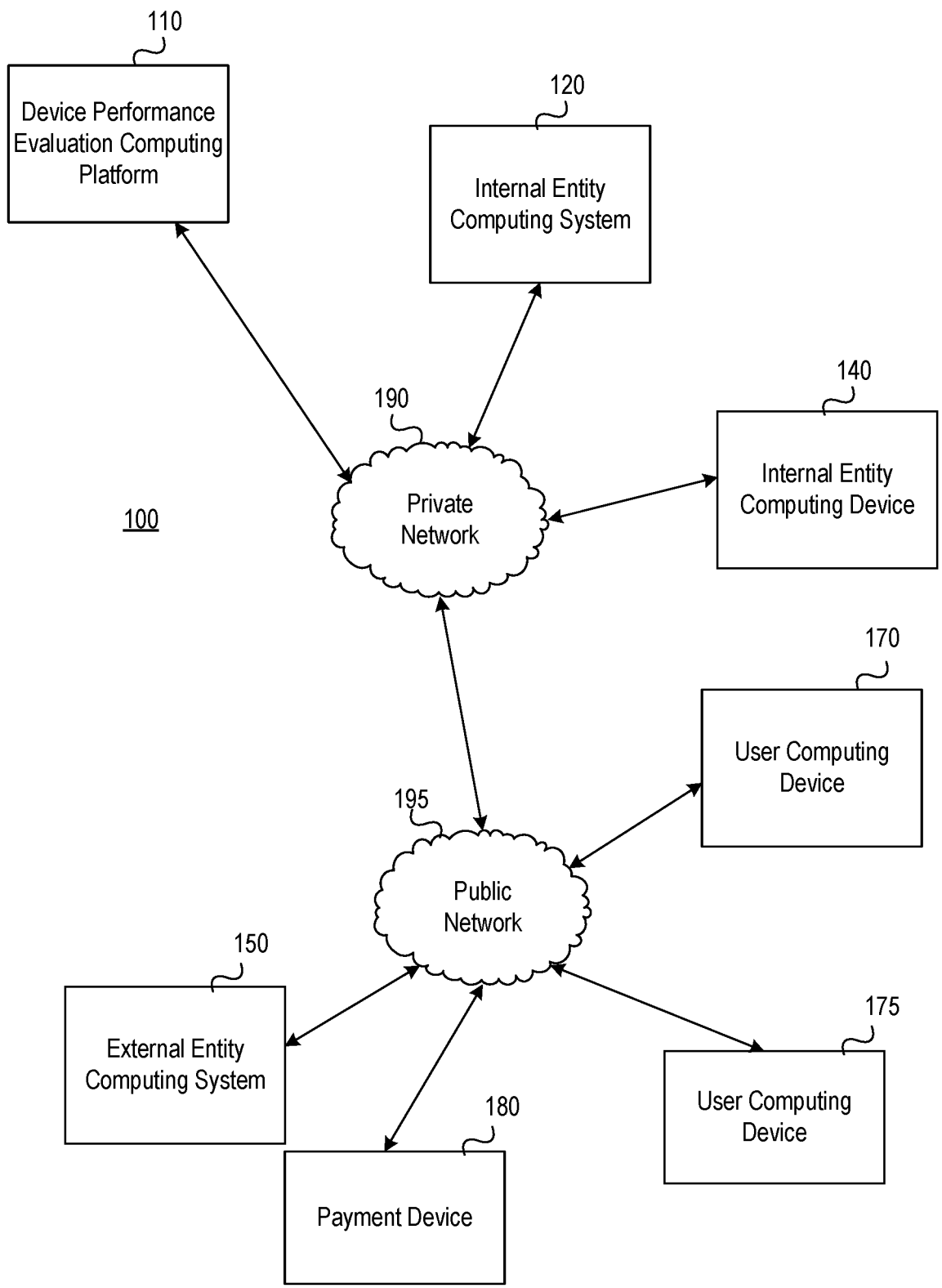
FIGS. 1A and 1B depict an illustrative computing environment for implementing device performance and functionality evaluation functions in accordance with one or more aspects described herein.
Figure 1B:
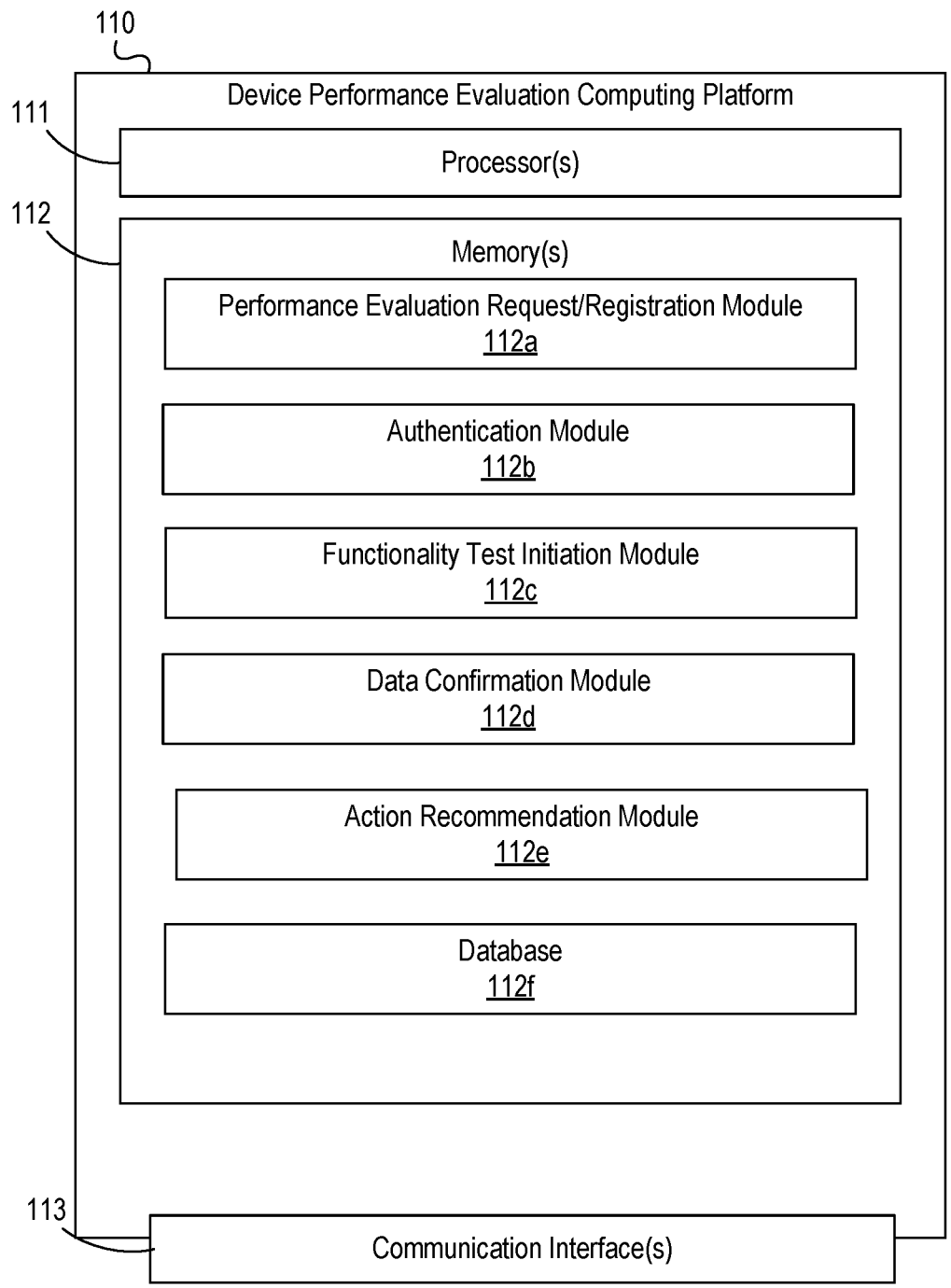

FIGS. 1A-1B depict an illustrative computing environment for implementing device performance evaluation functions in accordance with one or more aspects described herein. Referring to FIG. 1A, computing environment 100 may include one or more computing devices and/or other computing systems. For example, computing environment 100 may include device performance evaluation computing platform 110, internal entity computing system 120, internal entity computing device 140, external entity computing system 150, user computing device 170, user computing device 175, and payment device 180. Although one internal entity computing system 120, one internal entity computing device 140, one external entity computing systems 150, two user computing devices 170, 175 and one payment device 180 are shown, any number of systems or devices may be used without departing from the invention.

Device performance evaluation computing platform 110 may be configured to perform intelligent, dynamic, and efficient device performance evaluation functions. In some examples, the device performance evaluation functions may be performed in real-time or near real-time. For instance, a user may attempt to process a transaction via, for instance, a point-of-sale device, such as external entity computing system 150. In some examples, the attempt to process the transaction may fail (e.g., the card might not be accepted). Because it is often difficult to determine whether an issue resides with the external entity system or the payment device 180, a request to initiate device performance evaluation functions may be received by the device performance evaluation computing platform 110.

For instance, a user may launch an application on a user device, such as user computing device 170 or user computing device 175. In some examples, the application may be associated with an enterprise organization. In some examples, launching the application may constitute authentication of the user as the user may be logged in to the application via the user computing device 170, 175. Additionally or alternatively, authentication data may be requested from the user (e.g., via one or more user interfaces displayed on the user computing device 170, 175, via the application, or the like).

In some examples, a user may be provided with an option to initiate performance evaluation functions. For instance, a user interface displaying an option to initiate device performance evaluation functions may be provided via a display of the user computing device 170, 175. If the option is selected, device performance evaluation computing platform 110 may cause a signal to be transmitted from the user computing device 170, 175 to the payment device 180. For instance, near-field communication may be used to attempt to connect the user computing device 170, 175 to the payment device 180. If the connection is successful, device performance evaluation computing platform 110 may execute one or more additional diagnostic tests and/or flag the payment device 180 as functioning properly. If not, the device performance evaluation computing platform 110 may flag the payment device 180 as not properly functioning.

In some examples, device performance evaluation computing platform 110 may retrieve (e.g., from one or more internal systems such as internal entity computing system 120) user information, payment device 180 information, account information, and the like, associated with the user and/or payment device 180. In some examples, at least a portion of the retrieved information may be presented to the user (e.g., via a user interface displayed on user computing device 170, 175) for confirmation of accuracy. If the data is accurate, the system may store the data and a flag indicating accuracy. If the information is not accurate, a user may modify the information and the modified information may be stored.

In some examples, based on the confirmation of accuracy, as well as the output of the payment device functionality evaluation, one or more recommended actions may be identified and provided to the user. For instance, one or more actions indicating whether the payment device is faulty, whether it is likely that the external entity computing device is faulty, options for corrective action, and the like, may be generated and presented to the user.

Internal entity computing system 120 may be or include one or more computing devices or systems (e.g., servers, server blades, or the like) having one or more processors, memories, and the like, and may store or control user information, such as account information, payment device information, user identifying information, user contact information, and the like. For instance, in confirming functionality of the payment device, user data may be retrieved from internal entity computing system 120 and presented to the user for confirmation of accuracy. Any changes or modifications made by the user may then be transmitted to the internal entity computing system 120 and stored.

Internal entity computing device 140 may be or include one or more computing devices, such as laptop computing devices, desktop computing devices, tablet devices, mobile devices, or the like, that may be used by one or more employees or users associated with the enterprise organization. For instance, requests for action based on recommendations provided to the user may be processed via an internal entity computing device 140. For instance, a request for a replacement payment device, a request for additional assistance, and the like, may be processed via the internal entity computing device 140.

User computing device 170 and/or user computing device 175 may be or include user computing devices such as smartphones, smart watches, tablet computing devices, laptop computing devices, and the like. In some examples, user computing device 170 and/or user computing device 175 may be used to access an application hosted by the enterprise organization (e.g., a mobile banking application, an online banking application, or the like) to provide authentication information to enable or initiate the functionality evaluation process. In some arrangements, one or more notifications (e.g., recommended actions, request for confirmation of accuracy of data, or the like) may be displayed by a display of user computing device 170 and/or user computing device 175.

External entity computing system 150 may be or include one or more computing devices or systems (e.g., servers, server blades, or the like) having one or more processors, memories, and the like, that may host or execute one or more applications providing transaction processing services for one or more entities. For instance, external entity computing system 160 and/or external entity computing system 165 may be or include a point-of-sale system at one or more entities or entity locations that may be used to process transactions.

Payment device 180 may be or include a credit card, debit card, or the like (e.g., other standard sized or shaped payment card having a generally planar surface). Payment device 180 may include one or more embedded chips, power supplies, antennae and the like, configured to exchange information with, for examples, external entity computing system 150, to process one or more transactions.

As mentioned above, computing environment 100 also may include one or more networks, which may interconnect one or more of device performance evaluation computing platform 110, internal entity computing system 120, internal entity computing device 140, external entity computing system 150, payment device 180, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, device performance evaluation computing platform 110, internal entity computing system 120, and/or internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect device performance evaluation computing platform 110, internal entity computing system 120, and/or internal entity computing device 140, and one or more other computing devices and/or computer systems that are used by, operated by, and/or otherwise associated with the organization. Public network 195 may connect private network 190 and/or one or more computing devices connected thereto (e.g., device performance evaluation computing platform 110, internal entity computing system 120, and/or internal entity computing device 140) with one or more networks and/or computing devices that are not associated with the organization. For example, external entity computing system 150, payment device 180, user computing device 170 and/or user computing device 175, might not be associated with an organization that operates private network 190 (e.g., because external entity computing system 150, payment device 180, user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, payment device 180, user computing device 170 and/or user computing device 175 to private network 190 and/or one or more computing devices connected thereto (e.g., device performance evaluation computing platform 110, internal entity computing system 120, and/or internal entity computing device 140).

Referring to FIG. 1B, device performance evaluation computing platform 110 may include one or more processors 111, memory 112, and communication interface 113. A data bus may interconnect processor(s) 111, memory 112, and communication interface 113. Communication interface 113 may be a network interface configured to support communication between device performance evaluation computing platform 110 and one or more networks (e.g., private network 190, public network 195, or the like). Memory 112 may include one or more program modules having instructions that when executed by processor(s) 111 cause device performance evaluation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of device performance evaluation computing platform 110 and/or by different computing devices that may form and/or otherwise make up device performance evaluation computing platform 110.

For example, memory 112 may have, store and/or include performance evaluation request/registration module 112*a*. Performance evaluation request/registration module 112*a* may store instructions and/or data that may cause or enable the device performance evaluation computing platform 110 to receive a request to register one or more payment devices (e.g., payment device 180) with the device performance evaluation computing platform 110. For instance, a user may request (e.g., via a mobile device executing an application hosted by the enterprise organization) to register one or more payment devices 180 to enable device performance evaluation functions. The registration data may include a device or account number, user information associated with the device, expiration date, card verification value (CVV) number, and the like. In some examples, registration data may include authentication data, such as biometric data, personal identification number (PIN), username and password combination, and the like.

Device performance evaluation computing platform 110 may further have, store and/or include authentication module 112*b*. Authentication module 112*b* may store instructions and/or data that may cause or enable the device performance evaluation computing platform 110 to authenticate a user prior to executing one or more device performance evaluation functions. For instance, authentication module 112*b* may receive data from a user mobile device, such as user computing device 170, user computing device 175, or the like, and determine whether an application hosted by the enterprise organization implementing the device performance evaluation computing platform 110 is running or executing on the device. If so, the user may be considered authenticated based on the user being logged in to the application on the device and data may be provided to the user via one or more user interfaces presented via the application.

In another example, authentication module 112*b* may generate one or more requests for authentication data (e.g., request for PIN, username and password, biometric data, or the like) and may transmit the request to a pre-registered user device (e.g., user computing device 170, user computing device 175, or the like). The user may submit authentication response data that may be received by the authentication module 112*b* and compared to pre-stored data (e.g., data received during the registration process).

Various other authentication processes may be used without departing from the invention.

Device performance evaluation computing platform 110 may further have, store and/or include functionality test initiation module 112*c*. Functionality test initiation module 112*c* may store instructions and/or data that may cause or enable the device performance evaluation computing platform 110 to initiate a diagnostic test with a payment device 180. For instance, upon detecting failure of a requested transaction, a user may initiate (e.g., via an application hosted by the enterprise organization and executing on the user's mobile device) a diagnostic test of, for instance, the payment device 180. The diagnostic test may use near-field communication to attempt communication or connection with the payment device 180. An outcome of the diagnostic test may be used to generate one or more recommended actions.

Device performance evaluation computing platform 110 may further have, store and/or include data confirmation module 112d. Data confirmation module 112d may store instructions and/or data that may cause or enable the device performance evaluation computing platform 110 to retrieve user data, account data, payment device 180 data, and the like (e.g., from internal entity computing system 120) and present the data to the user via a user interface displayed on user computing device 170, user computing device 175, or the like, for confirmation of accuracy. For instance, the data confirmation module 112d may generate a user interface requesting a user confirm a current address, data visible on the payment device 180, current phone number, or the like. This may aid in determining whether the transaction failed due to a user issue or an external entity issue. The user may provide modified data (e.g., corrected information) via the user interface and it may be stored. In some examples, data confirmation module 112d may receive payment device 180 data captured from the device and compare it to the stored or expected data to identify any anomalies and/or confirm that the appropriate card is being used (e.g., that a currently active card is being used rather than a deactivated or expired card).

Device performance evaluation computing platform 110 may further have, store and/or include action recommendation module 112e. Action recommendation module 112e may store instructions and/or data that may cause or enable device performance evaluation computing platform 110 to generate one or more recommended actions for a user. For instance, if a diagnostic test determines that the payment device 180 is functioning as expected, the action recommendation module 112e may provide a recommendation to confirm that the external entity computing system 150 is also functioning as expected. In another example, if the diagnostic test determines that the payment device is not functioning as expected, the action recommendation module 112e may generate a recommendation that the user request a new payment device, contact customer service (e.g., via an option provided on the recommendation interface), or the like. Various other recommendations may be provided without departing from the invention.

Device performance evaluation computing platform 110 may further have, store and/or include a database 112f. Database 112f may store historical data related to diagnostic tests, outcome, recommendations generated, and the like. Additional data may be stored in database 112f without departing from the invention.

FIGS. 2A-2J depict one example illustrative event sequence for implementing software analysis functions in accordance with one or more aspects described herein. The events shown in the illustrative event sequence are merely one example sequence and additional events may be added, or events may be omitted, without departing from the invention. Further, one or more processes discussed with respect to FIGS. 2A-2J may be performed in real-time or near real-time.

Figure 2A:
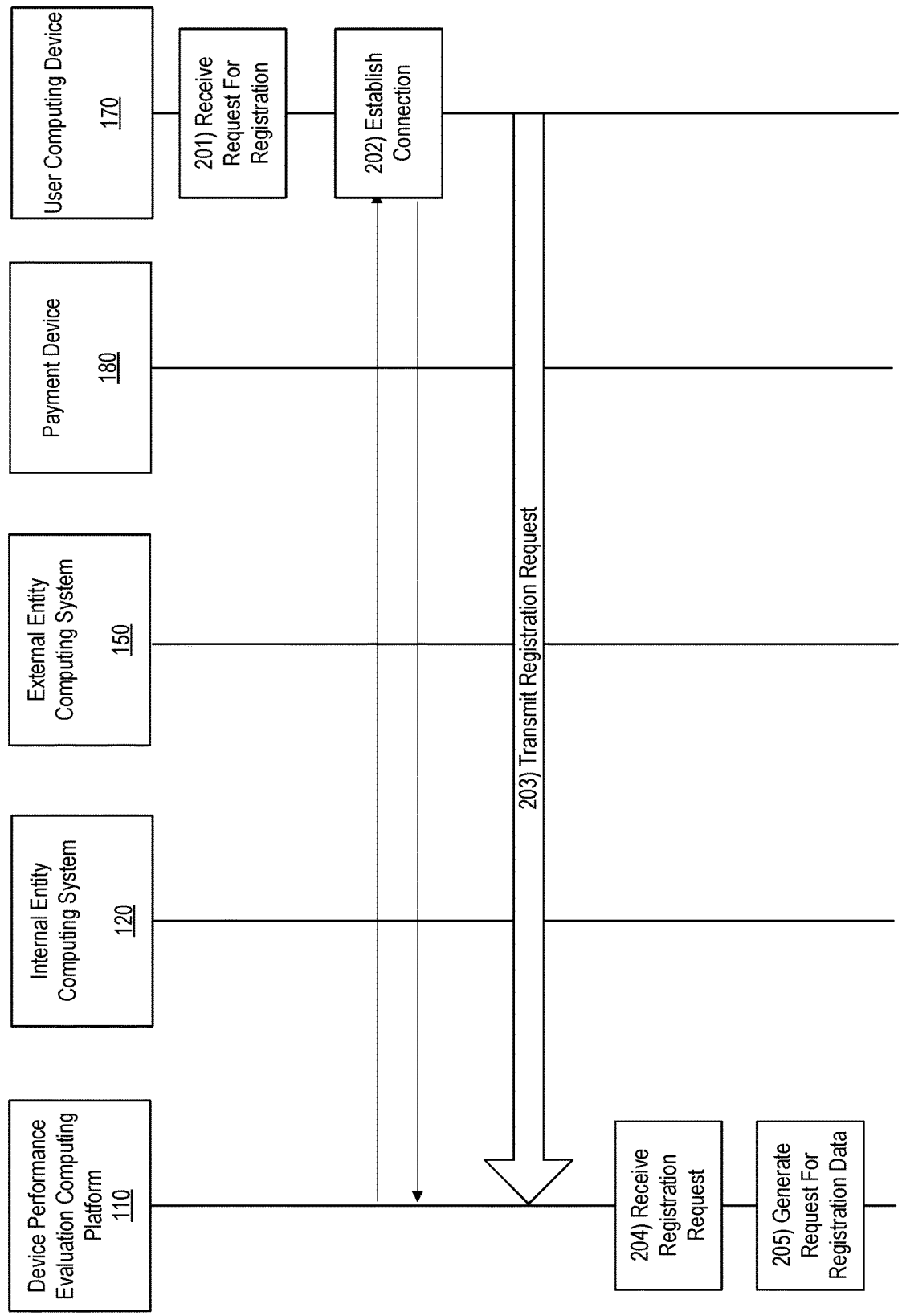

With reference to FIG. 2A, at step 201, user computing device 170 may receive a request for registration. For instance, a user may input, via a touchscreen, keypad, or the like, user input requesting registration with the device performance evaluation computing platform 110. In some examples, the request may be received by an application executing on user computing device 170 and hosted by an enterprise organization implementing the device performance evaluation computing platform 110.

At step 202, user computing device 170 may connect to device performance evaluation computing platform 110. For instance, a first wireless connection may be established between user computing device 170 and device performance evaluation computing platform 110. Upon establishing the first wireless connection, a communication session may be initiated between user computing device 170 and device performance evaluation computing platform 110.

At step 203, user computing device 170 may transmit the registration request to the device performance evaluation computing platform 110. For instance, the request for registration may be transmitted during the communication session initiated upon establishing the first wireless connection.

At step 204, device performance evaluation computing platform 110 may receive the registration request and may process the request. For instance, in response to receiving the request for registration, at step 205, device performance evaluation computing platform 110 may generate a request for registration data. The request for registration data may include a request for user data, account data, payment device data, user computing device data, and the like.

Figure 2B:
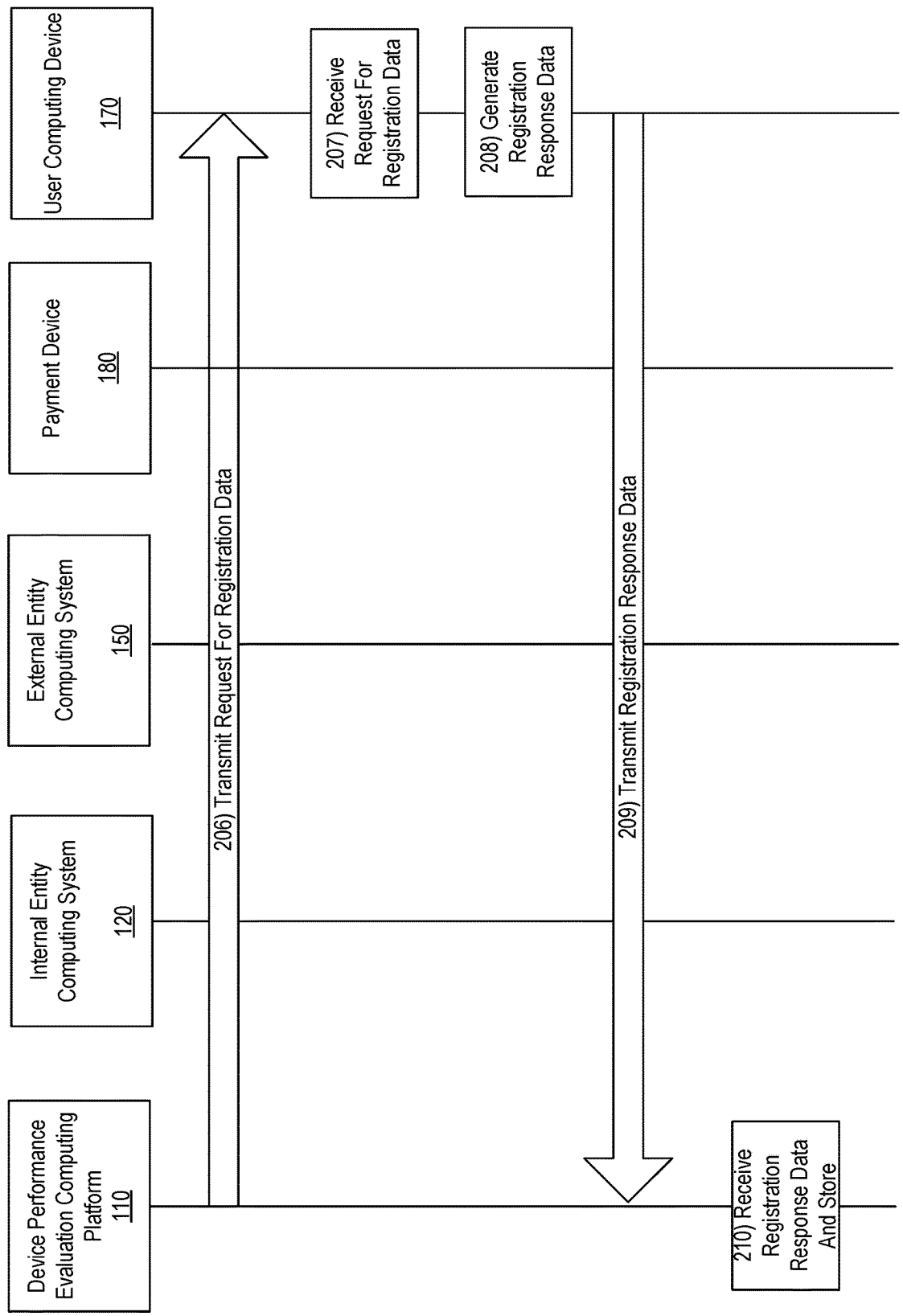

With reference to FIG. 2B, at step 206, the device performance evaluation computing platform 110 may transmit or send the request for registration data to the user computing device 170. In some examples, the request may be transmitted or sent during the communication session initiated upon establishing the first wireless connection. In other examples, a new connection and communication session may be established.

At step 207, the user computing device 170 may receive the request for registration data.

At step 208, user computing device 170 may generate registration response data. For instance, user data, payment device 180 data, device data (e.g., device identifier, or the like) may be received or extracted by user computing device 170. The received or extracted data may be compiled to generate registration response data.

At step 209, the user computing device 170 may transmit the registration response data to the device performance evaluation computing platform 110.

At step 210, device performance evaluation computing platform 110 may receive the registration response data and may store the data. For instance, device performance evaluation computing platform 110 may modify a database to include an entry for the user, user computing device 170, payment device 180, or the like.

Figure 2C:
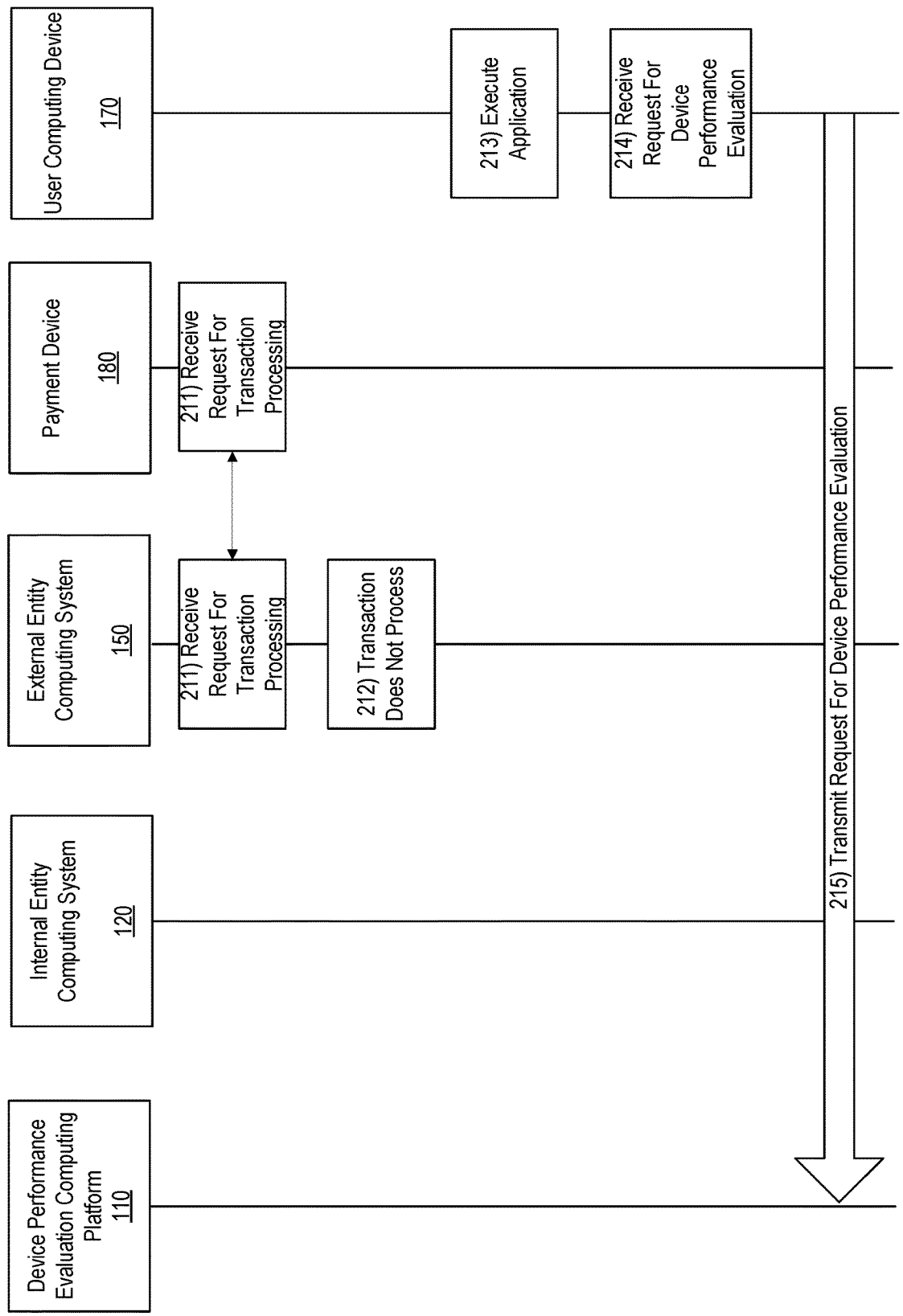

With reference to FIG. 2C, at step 211, an attempt to process a transaction may be initiated between the payment device 180 and the external entity computing system 150. For instance, a user may initiate a transaction at, for instance, a point-of-sale system, using a payment device 180, such as a credit card, debit card, or the like. In some examples, the attempt to process the transaction may be made using an embedded chip on the payment device 180, data from a magnetic strip on the payment device 180 (e.g., via a swipe of the card), user may input a card number from the payment device 180 and other data from the payment device 180, or the like.

At step 212, an indication that the transaction did not process or complete may be generated by the external entity computing system 150 and displayed by a display of the external entity computing system 150. For instance, an error message, an indication that the card was not processed, an indication that the requested transaction was declined or failed, or the like, may be generated and displayed by a display of the external entity computing system.

At step 213, the user computing device 170 may execute an application. For instance, in response to the notification of incomplete or unsuccessful transaction, a user may launch an application hosted by the enterprise organization, such as a mobile banking application, associated with the payment device 180. In launching the application, in some examples, a user may automatically be authenticated to the mobile application.

At step 214, the user computing device 170 may receive a request to run a diagnostic tool that may provide device performance evaluation information. For instance, a user may input, via the application executing on the user computing device 170, a request to run the diagnostic tool and perform device performance evaluation to determine whether the issue with the unsuccessful transaction was associated with the payment device 180 or with the external entity computing system 150. In some examples, one or more menus on the mobile application may include a selectable option to run or execute a diagnostic tool.

Upon the user computing device 170 receiving selection of an option to run the diagnostic tool, an indication that a request for device performance evaluation has been received may be transmitted by the user computing device 170 to the device performance evaluation computing platform 110 at step 215. In some examples, the device performance evaluation computing platform 110 may be part of (e.g., in a same physical device, or the like), the user computing device 170. Alternatively, the device performance evaluation computing platform 110 may be a separate device that is connected to or in communication with user computing device 170. Accordingly, functions performed by the computing platform may be performed by the user computing device 170, 175, and vice versa, without departing from the invention.

With reference to FIG. 2D, at step 216, the request for device performance evaluation may be analyzed. For instance, the request for device performance evaluation may include additional data, such as a device identifier, an indication that the mobile application is running on the mobile device and the user is authenticated to the application, user information, payment device 180 information, and the like. This data may be analyzed by the device performance evaluation computing platform 110.

At step 217, based on the analysis at step 216, device performance evaluation computing platform 110 may determine whether the user is authenticated. For instance, in some examples, receiving the request via the mobile application and the indication that the mobile application is running on the device and the user is authenticated may be sufficient to authenticate the user (e.g., device performance evaluation computing platform 110 may rely on authentication by the mobile application (e.g., via biometrics, stored data, or the like to authenticate the user). In some examples, device performance evaluation computing platform 110 may compare a name or user identified associated with the payment device 180 to a name or user identifier associated with the mobile application or authenticated user of the mobile application to confirm a match exists. If not, the request may be denied or the process may proceed to step 218. If so, the user is authenticated. If the user is authenticated based on one or more arrangement described, the process may proceed to step 224 in FIG. 2E.

If, at step 217, based on the analyzed data, the user is not authenticated, at step 218, a request for authentication data may be generated by the device performance evaluation computing platform 110. For instance, a request for a user to provide one or more forms of authentication data (e.g., PIN, username and password, biometrics, or the like) may be generated.

At step 219, the device performance evaluation computing platform 110 may transmit the request for authentication data to the user computing device 170. At step 220, the user computing device 170 may receive the request for authentication data and may display the request on a display of user computing device 170.

Figure 2E:
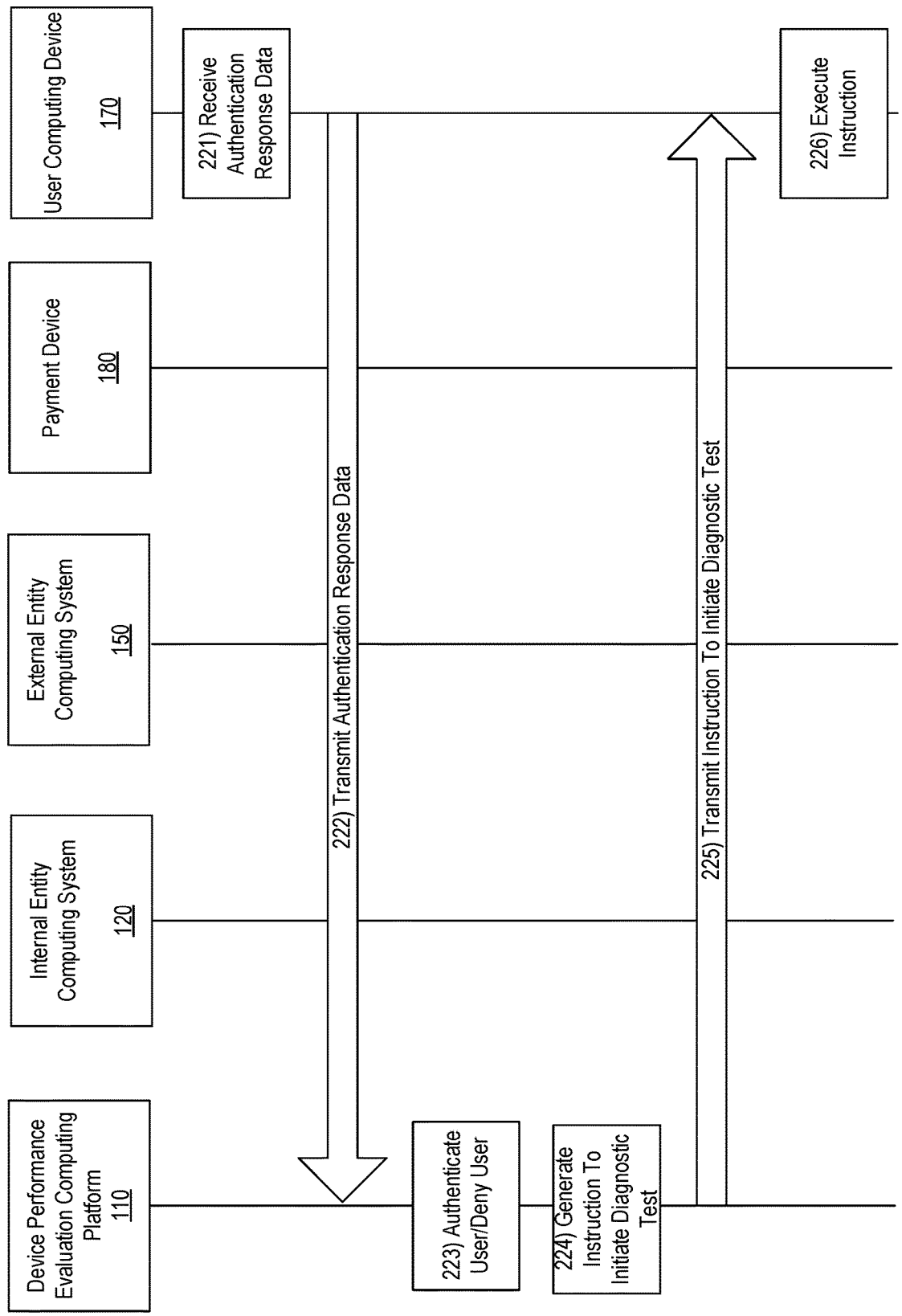

With reference to FIG. 2E, at step 221, user computing device 170 may receive authentication response data. For instance, a user may input requested authentication data (e.g., biometrics, PIN, or the like) and the user computing device 170 may generate authentication response data based on the user input.

At step 222, the user computing device 170 may transmit the authentication response data to the device performance evaluation computing platform 110.

At step 223, device performance evaluation computing platform 110 may evaluate the authentication response data to generate an authentication output. For instance, received authentication data may be compared to pre-stored authentication data (e.g., received during, for instance, a registration process) to determine whether the user is authenticated. If not, the request to run diagnostics may be denied. If so, the process may proceed.

At step 224, an instruction to initiate a diagnostic test may be generated. The instruction may include a command causing the user computing device 170 to execute one or more diagnostic tool functions including, for instance, attempting to connect to the payment device, capturing data stored by the payment device for evaluation, and the like.

At step 225, device performance evaluation computing platform 110 may transmit the generated instruction to the user computing device 170. At step 226, the user computing device may execute the generated instruction (e.g., receipt of the instruction may automatically cause the user computing device 170 to execute one or more diagnostic tool functions).

Figure 2F:
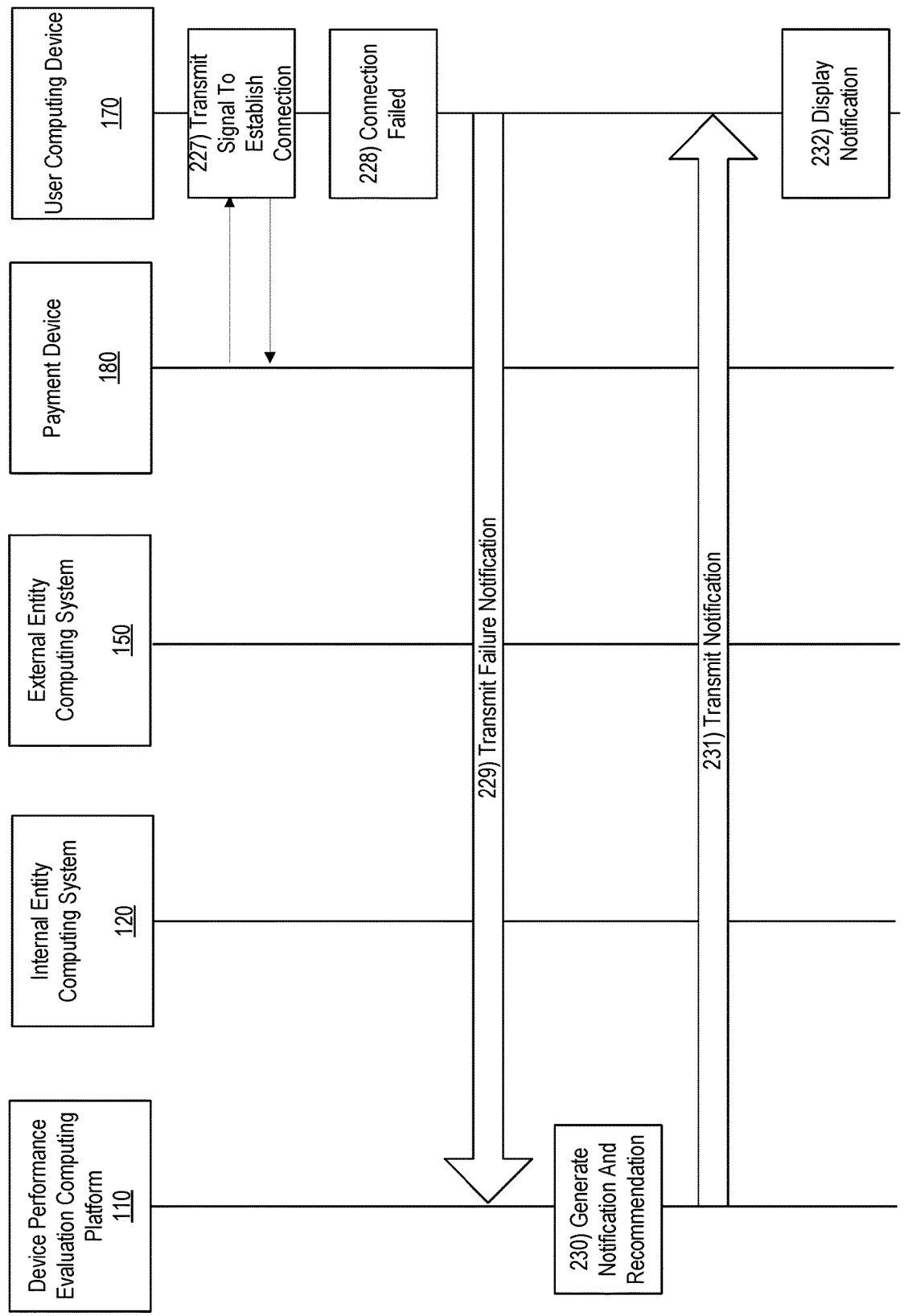

With reference to FIG. 2F, at step 227, user computing device 170 may transmit a signal to attempt to connect with, for instance, a contactless connection capability of the payment device 180. For instance, the user computing device 170 may use near-field communication to attempt to connect to payment device 180 (e.g., to ensure an antenna embedded on the payment device 180 is functioning properly). If the connection is successful, the process may proceed to step 233 in FIG. 2G.

At step 228, if the attempted connection between the user computing device 170 and the payment device 180 fails, an indication of failure may be generated by the user computing device 170. In some examples, more than one attempt to connect may be made (e.g., failure may be identified after at least a threshold number of attempts (e.g., one, two, three, or the like) have failed).

At step 229, the user computing device 170 may transmit the indication of the failed connection attempt the device performance evaluation computing platform 110.

At step 230, device performance evaluation computing platform 110 may receive the indication of the failed connection attempt and may generate a notification and recommendation for next steps. For instance, failure of the user computing device 170 to connect to the payment device 180 (e.g., using near-field communication) may indicate that the card has failed and a replacement card must be sent. Accordingly, a notification indicating that the payment device 180 is no longer functioning and that a new card will be automatically sent to the user may be generated.

Figure 4:
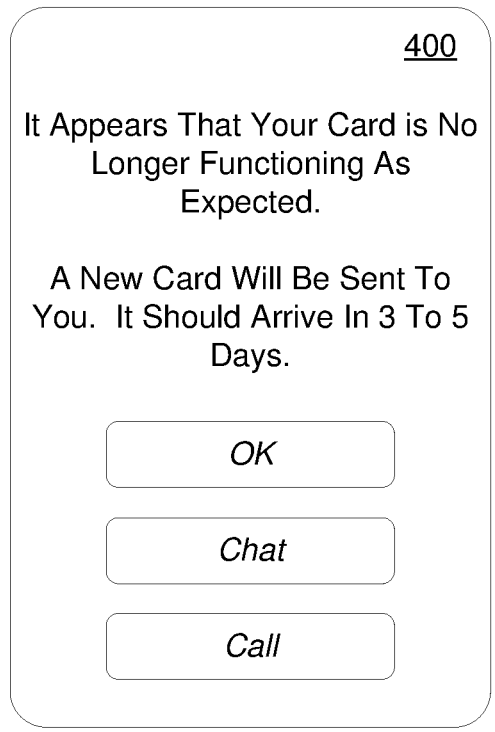
FIGS. 4-7 illustrates example notifications that may be generated in accordance with one or more aspects described herein.

At step 231, device performance evaluation computing platform 110 may transmit the generated notification to the user computing device 170. At step 232, transmitting the notification may cause the notification to display on a display of user computing device 170. FIG. 4 illustrates one example notification and recommendation that may be generated and displayed. As shown, user interface 400 may include an indication that the payment device 180 is no longer functioning as expected and may include an identified recommended action (e.g., a new device is being sent). In some examples, the user interface 400 may include an option to "click to call" a customer service representative or chat with a customer service representative. The notification may, in some examples, be displayed via the mobile application hosted by the enterprise organization.

With reference to FIG. 2G, if the attempted connection at step 227 is successful, the user computing device 170 may connect to the payment device 180 (e.g., via near-field communication) and may request data from the payment device 180 at step 233. For instance, user computing device 170 may request data associated with keys programmed onto the payment device, card number, expiration date, CVV, and the like.

At step 234, the user computing device 170 may transmit the request for data to the payment device 180. At step 235, the payment device 180 may identify the requested data and transmit response data at step 236.

At step 237, the user computing device 170 may transmit the indication of successful connection, as well as the data received from the payment device 180, to the device performance evaluation computing platform 110.

At step 238, device performance evaluation computing platform 110 may receive the data and analyze the data to evaluate performance and functionality of the payment device 180 and/or generate one or more recommended actions. For instance, device performance evaluation computing platform 110 may analyze the data associated with keys retrieved from payment device 180 to confirm that the keys from the device correspond to expected keys to perform a transaction. If so, device performance evaluation computing platform 110 may identify the payment device 180 as functioning as expected. If not, the payment device might not be functioning as expected and a new device may be sent the user (e.g., payment device 180 may be deactivated and a new device sent to the user).

Figure 2H:
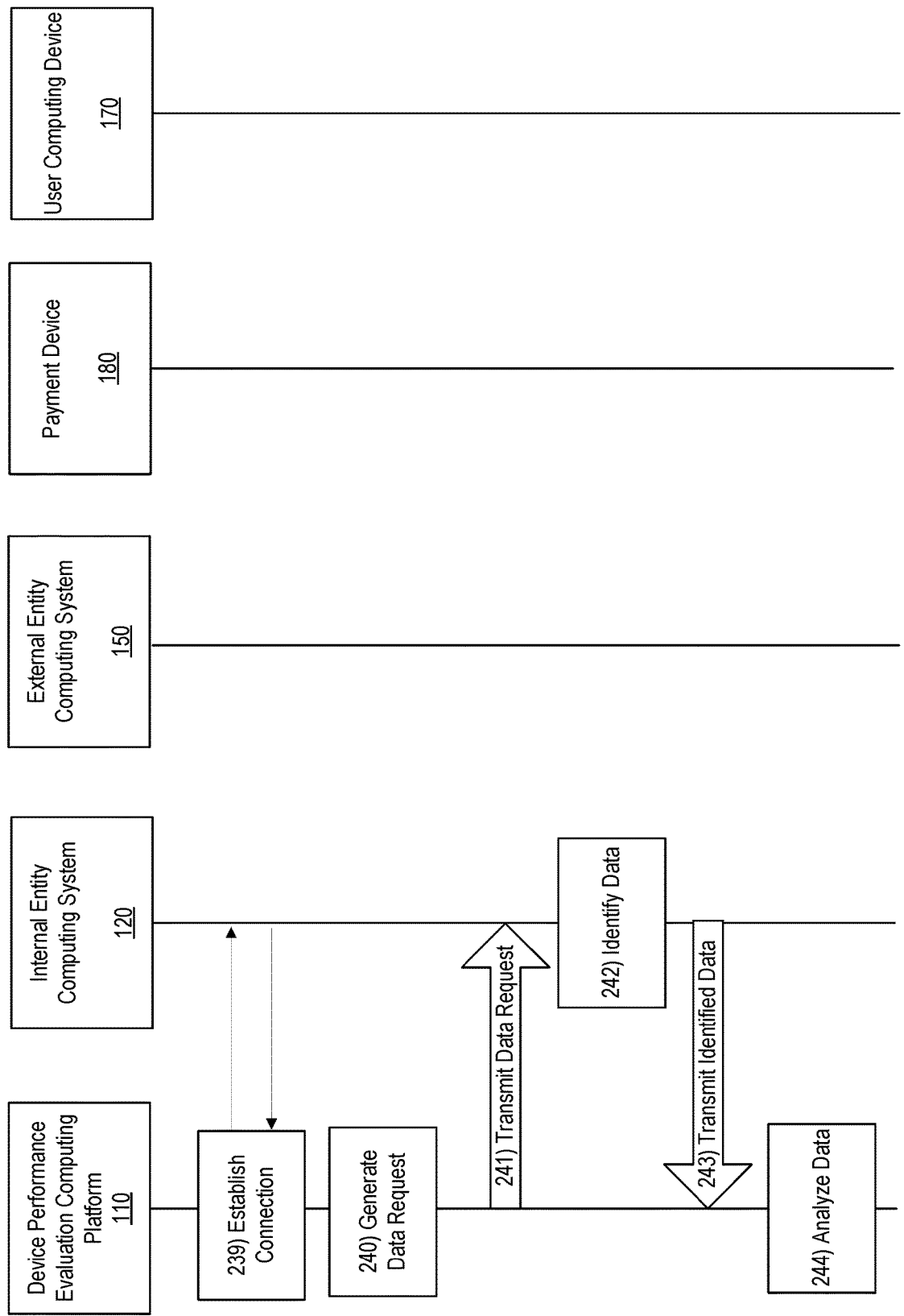

With reference to FIG. 2H, at step 239, device performance evaluation computing platform 110 may connect to internal entity computing system 120. For instance, a second wireless connection may be established between device performance evaluation computing platform 110 and internal entity computing system 120. Upon establishing the second wireless connection, a communication session may be initiated between device performance evaluation computing platform 110 and internal entity computing system 120.

At step 240, device performance evaluation computing platform 110 may generate a request for data. For instance, device performance evaluation computing platform 110 may generate a request for user data, payment device 180 data (e.g., card number, expiration data, CVV), user address data, and the like.

At step 241, device performance evaluation computing platform 110 may transmit or send the request for data to the internal entity computing system 120. For instance, the device performance evaluation computing platform 110 may transmit the request during the communication session initiated upon establishing the second wireless connection.

At step 242, internal entity computing system 120 may identify data responsive to the data request (e.g., payment device 180 data, user data, address data, and the like) and response data may be generated based on the identified data. At step 243, internal entity computing system 120 may transmit or send the response data to the device performance evaluation computing platform 110.

At step 244, device performance evaluation computing platform 110 may analyze the data received from internal entity computing system 120. For instance, device performance evaluation computing platform 110 may compare the data received from the internal entity computing system 120 to the payment device 180 data received to determine whether the data matches or is expected. For instance, a card number associated with the payment device 180 that was received from the payment device 180 may be compared to a stored card number that is expected. If the numbers match, the payment device 180 may be the expected device. If not, the user may be attempting to use a payment device 180 that is no longer active (e.g., a new payment device may be mailed to the user and the old device 180 may be deactivated but the user has not received the new device yet). In another example, an expiration data and/or CVV of the payment device 180 may be compared to the stored device data from the internal entity computing system 120 to confirm whether it matches or is expected. If so, the device may be the expected device 180. If not, an issue may have occurred (e.g., user is attempting to use a deactivated device).

In some examples, the system may also use this opportunity to confirm stored data of the user. Accordingly, with reference to FIG. 2I, at step 245, a data confirmation request may be generated. For instance, a request to confirm a current address of the user, email address, phone number, or the like, may be generated.

Figure 5:
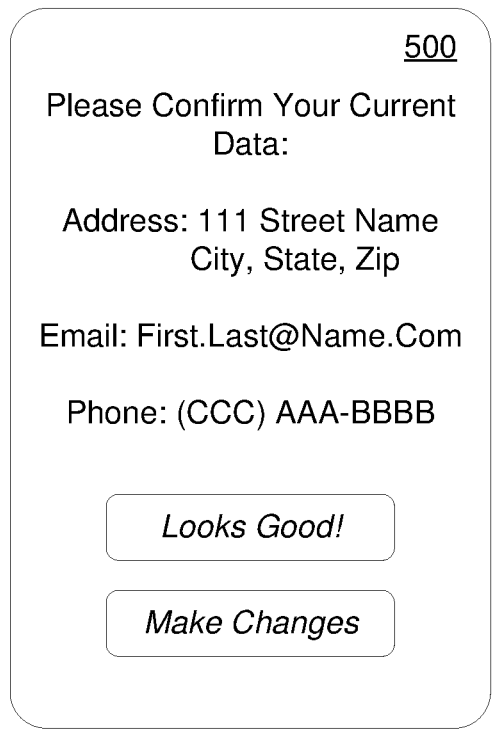

At step 246, device performance evaluation computing platform 110 may transmit or send the data confirmation request to the user computing device 170. In some examples, sending the data confirmation request may cause the data confirmation request to be displayed by a display of the user computing device 170 at step 247. FIG. 5 illustrates one example user interface that may be displayed. The interface 500 includes identification of address and contact information for the user and requests the user to confirm accuracy (e.g., "Looks Good") or provide modified data (e.g., "Make Changes").

At step 248, user confirmation response data may be received. The user confirmation response data may include an indication of whether the data is correct or may include modified data to correct any errors or inaccurate data.

At step 249, the user confirmation response data may be transmitted or sent by the user computing device 170 to the device performance evaluation computing platform 110. At step 250, device performance evaluation computing platform 110 may receive the confirmation response data and may analyze the data to determine whether there are modifications to be stored or whether the response data indicates the data is accurate.

Figure 2J:
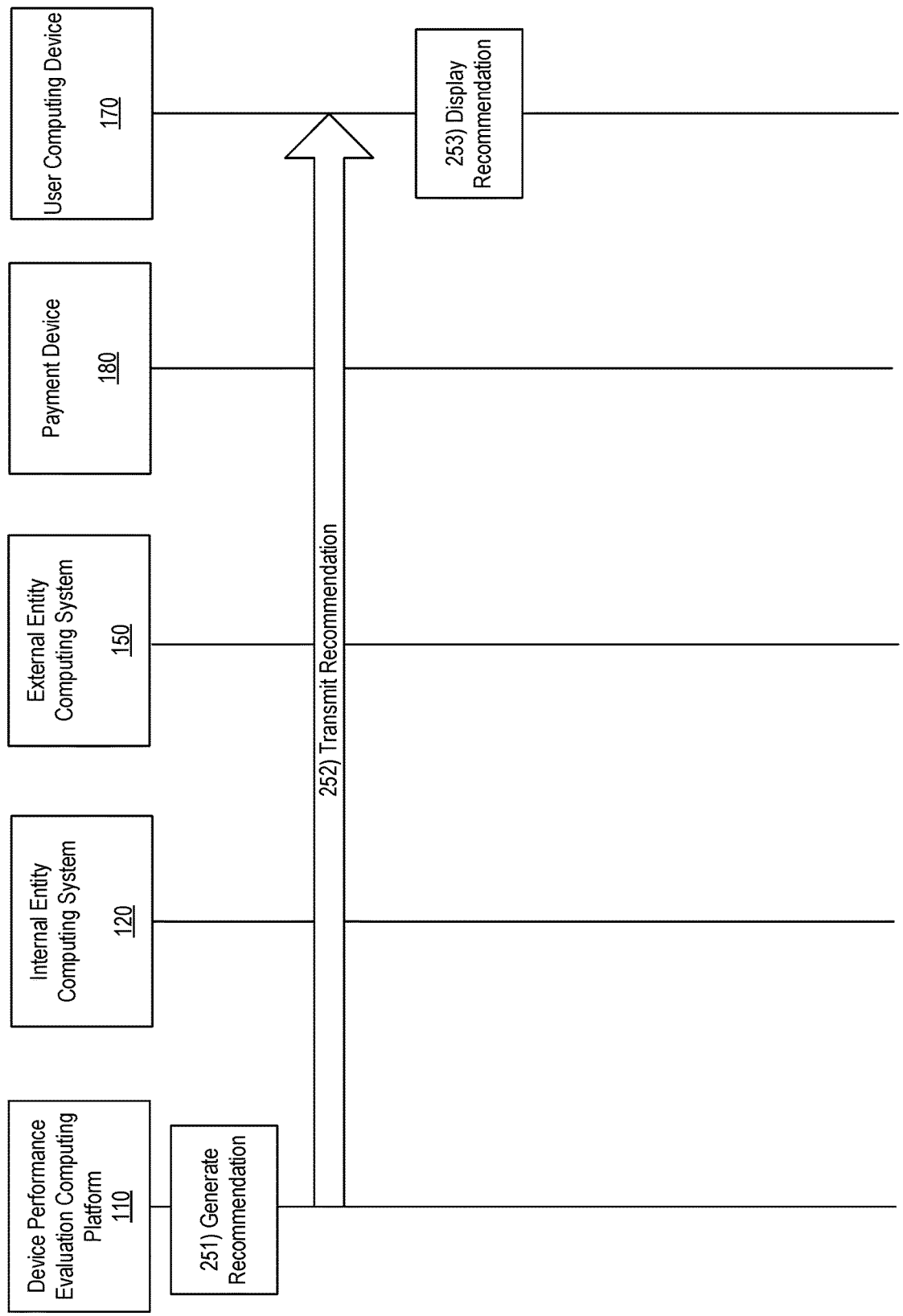
Figure 6:
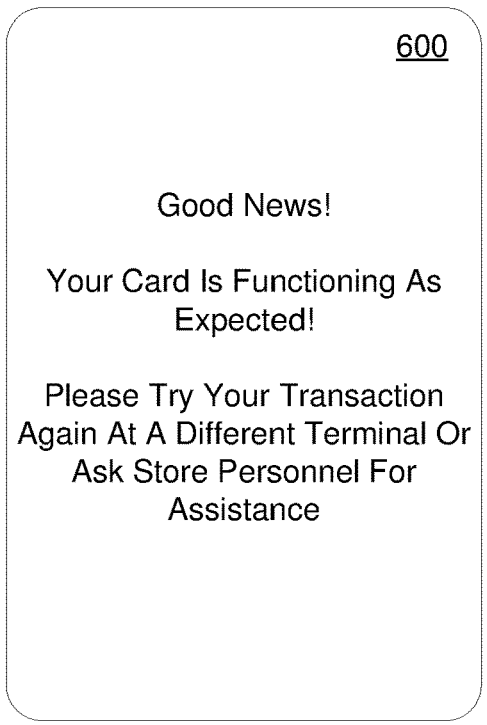

With reference to FIG. 2J, at step 251, device performance evaluation computing platform 110 may evaluate and analyze all data received and generate one or more recommendations or recommended actions. For instance, if the payment device 180 is functioning as expected, the issues with the failed transaction that prompted the device functionality evaluation may be with the external entity computing system 150 that attempted to process the transaction. Accordingly, a recommendation to attempt the transaction at a different terminal may be provided. For instance, FIG. 6 provides one example user interface 600 in which the user may be instructed to attempt the transaction at a different entity terminal.

Figure 7:
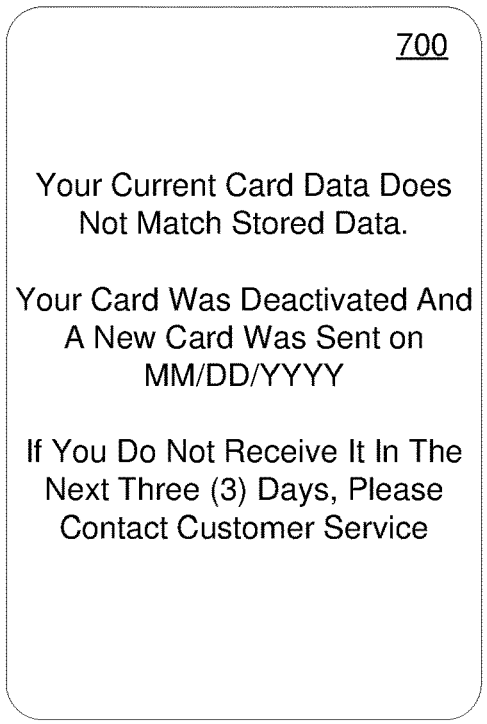

In another example, if data from the payment device 180 does not match stored or expected data, an indication that the payment device 180 was previously deactivated and a new device already sent may be provided. For instance, FIG. 7 illustrates one example user interface 700 indicating that the payment device 180 was deactivated and a new device was previously sent. The interface identifies the date the device was sent and an indication to contact customer service if the device is not received shortly.

At step 252, the device performance evaluation computing platform 110 may transmit or send the generated recommendation or recommended action to the user computing device 170. In some examples, sending the generated recommendation may cause the recommendation to be displayed by a display of user computing device 170 at step 253.

Figure 3:
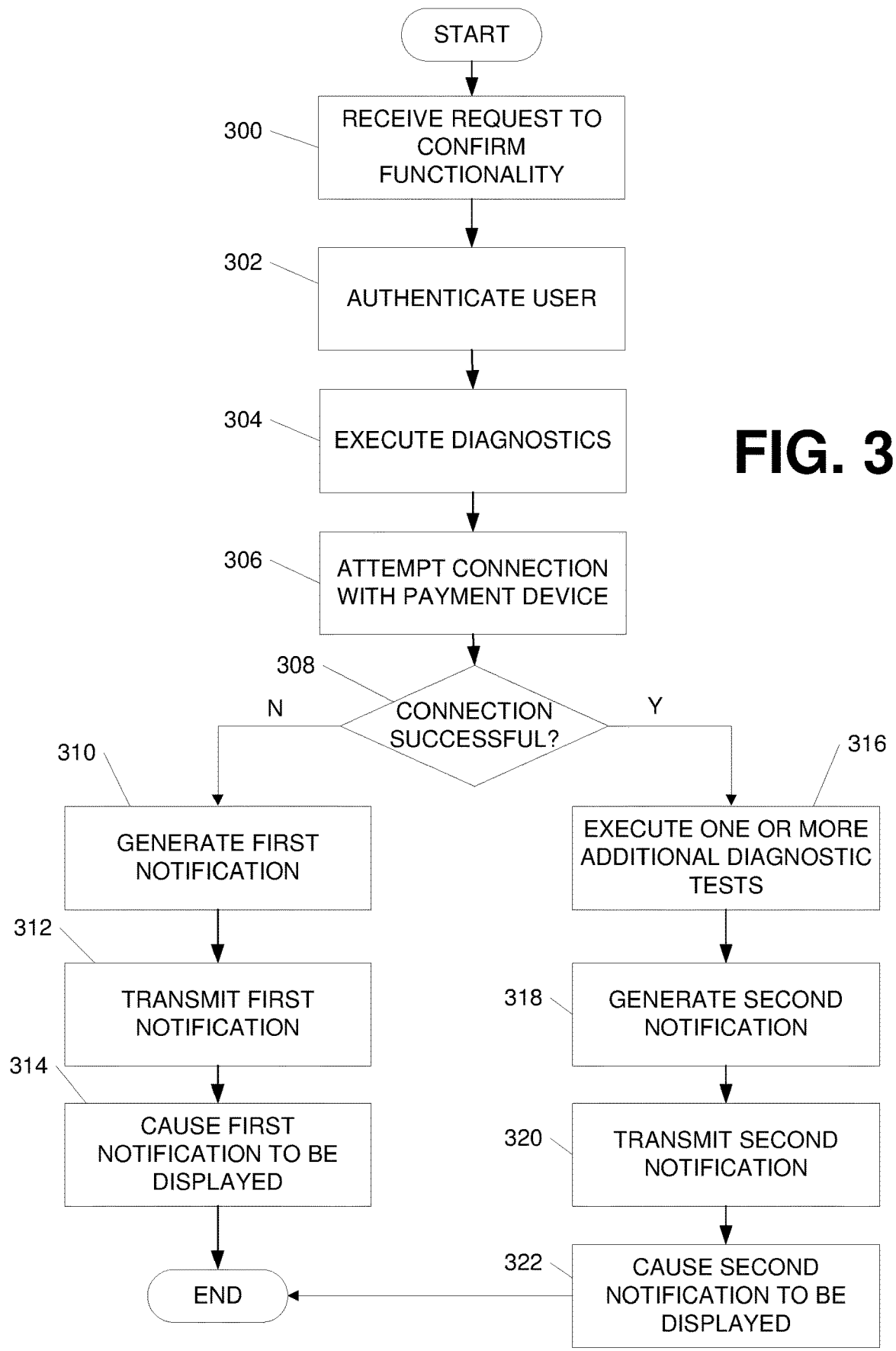
FIG. 3 illustrates an illustrative method for implementing device performance and functionality evaluation functions according to one or more aspects described herein.

FIG. 3 is a flow chart illustrating one example method of implementing device performance and functionality evaluation functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a request to evaluate performance or functionality of a payment device, such as a debit card, credit card, or the like may be received. In some examples, aspects described herein may be used to evaluate functionality of any standard sized card-type payment device having, for instance, contactless payment capability, as well as other devices having contactless payment capability.

At step 302, the user associated with the request may be authenticated. In some examples, the user may submit the request via an application hosted by an enterprise organization and executing on a user computing device (e.g., mobile device, or the like). In some examples, an indication that the application is running on the user computing device and the user is authenticated may be sufficient to authenticate the user. In other examples, additional authentication data may be requested and evaluated.

At step 304, responsive to authenticating the user, a diagnostic tool may be executed. For instance, a computing platform may execute or cause another device (e.g., a user computing device 170) to execute one or more diagnostic tests to evaluate performance and/or functionality of the payment device.

For instance, at step 306, an attempt to connect to the payment device 180 (e.g., via near-field communication) may be initiated.

At step 308, a determination may be made as to whether the attempted connection was successful. If not, at step 310, a first notification including a first recommendation may be generated. For instance, a notification indicating that the payment device is not functioning as expected and a new payment device will be sent to the user may be generated.

At step 312, the first notification may be transmitted or sent to, for instance, user computing device 170. At step 314, transmitting or sending the first notification to the user computing device 170 may cause the user computing device 170 to display the first notification.

If, at step 308, the connection attempt is successful, at step 316, one or more additional diagnostic tests may be executed. For instance, keys programmed onto the payment device 180 may be retrieved and compared to expected keys to process a transaction to confirm that the keys are as expected. In another example, payment device data such as card number, CVV, expiration date, and the like, may be received and compared to expected or stored payment device data to ensure the user is using the proper payment device 180.

Based on the output of the one or more additional diagnostic tests, at step 318, a second notification, different from the first notification may be generated. For instance, a second notification indicating that the payment device is functioning properly and providing one or more other recommendations (e.g., attempt the transaction at a different entity terminal, or the like) may be generated.

At step 320, the second notification may be transmitted or sent to, for instance, user computing device 170. At step 322, transmitting or sending the second notification to the user computing device 170 may cause the user computing device 170 to display the second notification.

As discussed herein, aspects described relate to providing device performance and functionality evaluation in real-time or near real-time to enable users to efficiently and quickly confirm functionality of a payment device, such as a debit card, credit card, or the like. Arrangements described herein rely on communication protocols such as near-field communication to confirm that aspects of the payment device (e.g., contactless payment) are functioning properly, confirm that antenna embedded in the payment device are functioning properly and are not damaged, and the like. Accordingly, the user is able to determine whether the payment device is still usable at a merchant terminal and, if not, arrangements provide for a new payment device to be sent to the user. If the card is still functioning, a recommendation to attempt the transaction at a different merchant or merchant terminal may be sent to the user.

While aspects described herein are related to confirming functionality of the payment device, in some examples, the arrangements described may be used to perform other functions associated with payment devices. For instance, near-field communication may be used to connect to the payment device in order to activate a new payment device. Accordingly, the user may launch a mobile application and, via the mobile application, may initiate a connection with the payment device in order to facilitate activation. In some examples, activation using these arrangements may include diagnostic testing to ensure the new payment device is functioning as expected.

Although aspects described herein include debit card, credit card, or the like, in some examples, device performance and functionality evaluation aspects described herein may be used with other devices, such as wearable devices, and the like, to confirm functionality of digital wallets, and the like.

Figure 8:
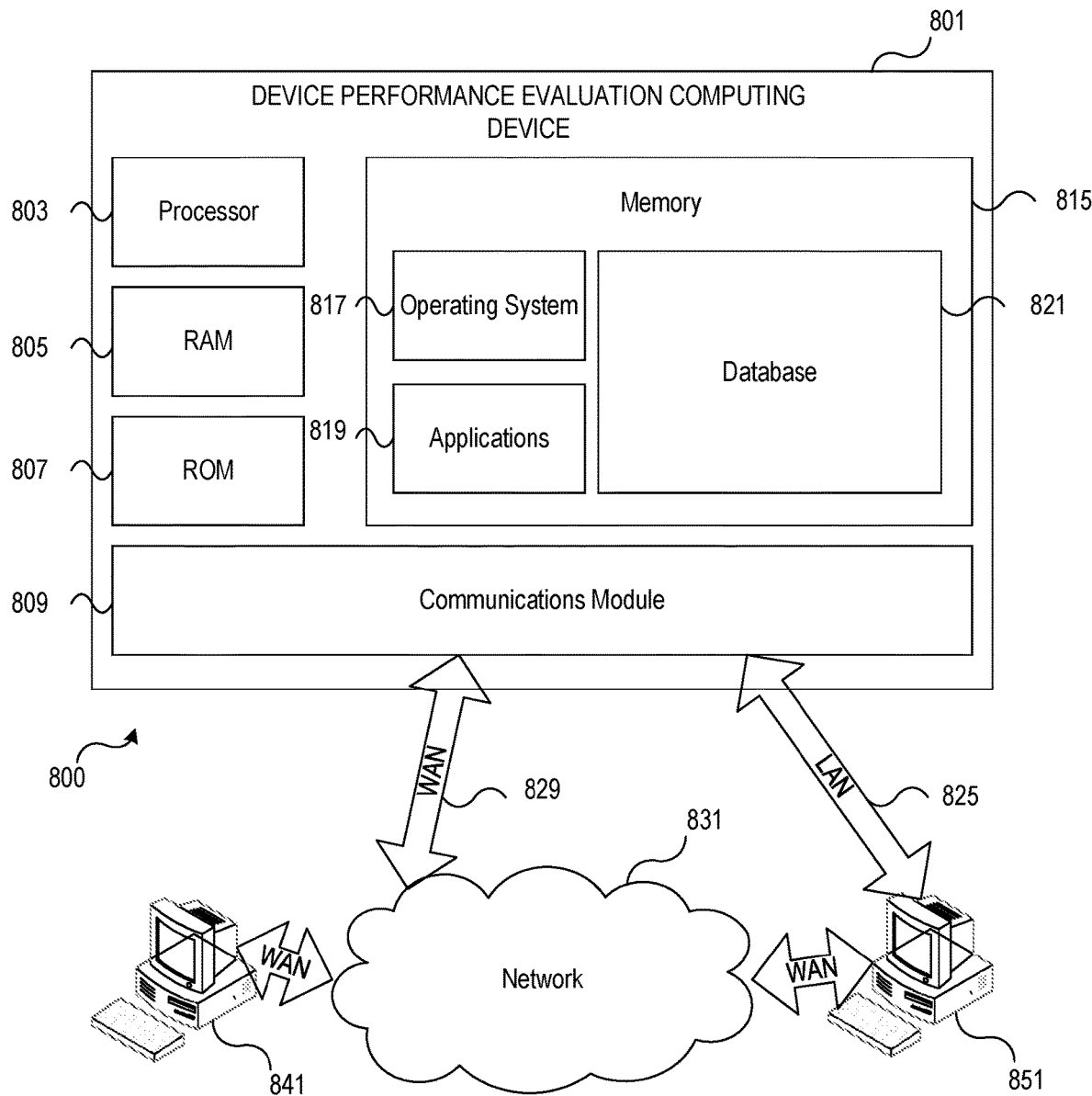
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include device performance evaluation computing device 801 having processor 803 for controlling overall operation of device performance evaluation computing device 801 and its associated components, including Random Access Memory (RAM) 805, Read-Only Memory (ROM) 807, communications module 809, and memory 815. Device performance evaluation computing device 801 may include a variety of computer readable media. Computer readable media may be any available media that may be accessed by device performance evaluation computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by device performance evaluation computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on device performance evaluation computing device 801. Such a processor may execute computer-executable instructions stored on a computer-readable medium.

Software may be stored within memory 815 and/or storage to provide instructions to processor 803 for enabling device performance evaluation computing device 801 to perform various functions as discussed herein. For example, memory 815 may store software used by device performance evaluation computing device 801, such as operating system 817, application programs 819, and associated database 821. Also, some or all of the computer executable instructions for device performance evaluation computing device 801 may be embodied in hardware or firmware. Although not shown, RAM 805 may include one or more applications representing the application data stored in RAM 805 while device performance evaluation computing device 801 is on and corresponding software applications (e.g., software tasks) are running on device performance evaluation computing device 801.

Communications module 809 may include a microphone, keypad, touch screen, and/or stylus through which a user of device performance evaluation computing device 801 may provide input, and may also include one or more of a speaker for providing audio output and a video display device for providing textual, audiovisual and/or graphical output. Computing system environment 800 may also include optical scanners (not shown).

Device performance evaluation computing device 801 may operate in a networked environment supporting connections to one or more remote computing devices, such as computing devices 841 and 851. Computing devices 841 and 851 may be personal computing devices or servers that include any or all of the elements described above relative to device performance evaluation computing device 801.

The network connections depicted in FIG. 8 may include Local Area Network (LAN) 825 and Wide Area Network (WAN) 829, as well as other networks. When used in a LAN networking environment, device performance evaluation computing device 801 may be connected to LAN 825 through a network interface or adapter in communications module 809. When used in a WAN networking environment, device performance evaluation computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive a request to confirm functionality of a payment card device to complete contactless payment transactions via a payment terminal;
   responsive to receiving the request, authenticate a user associated with the request;
   responsive to the user being authenticated, execute a diagnostic tool, executing the diagnostic tool by a user computing device including:
      transmitting, via near-field communication, a signal to the payment card device to attempt to establish a connection between the user computing device of a user associated with the payment card device and the payment card device;
      determining whether the attempt to establish the connection between the user computing device and the payment card device was successful;
      responsive to determining that the attempt to establish the connection between the user computing device and the payment card device was not successful, generate a first notification including a first recommended action, wherein the first recommended action includes at least options for corrective action; and
      responsive to determining that the attempt to establish the connection between the user computing device and the payment card device was successful, execute one or more additional diagnostic tests.

2. The computing platform of claim 1, wherein the payment card device is one of: a credit card or a debit card.

3. The computing platform of claim 1, wherein the one or more additional diagnostic tests include receiving keys loaded on the payment card device and confirming that the received keys correspond to expected keys to process a transaction.

4. The computing platform of claim 3, further including instructions that, when executed, cause the computing platform to:
   generate a second notification, different from the first notification, and including a second recommended action different from the first recommended action.

5. The computing platform of claim 4, wherein the request to confirm functionality of the payment card device is received responsive to a failed attempt to process the transaction by the payment terminal, and wherein the second notification includes an indication that the payment card device is functioning as expected and the second recommended action includes a recommendation to reattempt the transaction at a different payment terminal.

6. The computing platform of claim 1, wherein the one or more additional diagnostic tests include receiving card data from the payment card device and comparing the received card data to expected card data to identify a match.

7. The computing platform of claim 1, wherein authenticating the user includes receiving an indication that the user is authenticated by a mobile application executing on the user computing device of the user.

8. A method, comprising:
   receiving, by a computing device, the computing device having at least one processor, and memory, a request to confirm functionality of a payment card device to complete contactless payment transactions via a payment terminal;
   responsive to receiving the request, authenticating, by the at least one processor, a user associated with the request;
   responsive to the user being authenticated, executing, by the at least one processor, a diagnostic tool by a user computing device, executing the diagnostic tool including:
      transmitting, by the at least one processor and via near-field communication, a signal to the payment card device to attempt to establish a connection between the user computing device of a user associated with the payment card device and the payment card device;
      determining, by the at least one processor, whether the attempt to establish the connection between the user computing device and the payment card device was successful;

when it is determined that the attempt to establish the connection between the user computing device and the payment card device was not successful, generating, by the at least one processor, a first notification including a first recommended action wherein the first recommended action includes at least options for corrective action; and when it is determined that the attempt to establish the connection between the user computing device and the payment card device was successful, executing, by the at least one processor, one or more additional diagnostic tests.

9. The method of claim 8, wherein the payment card device is one of: a credit card or a debit card.

10. The method of claim 8, wherein the one or more additional diagnostic tests include receiving keys loaded on the payment card device and confirming that the received keys correspond to expected keys to process a transaction.

11. The method of claim 10, further including:
generating, by the at least one processor, a second notification, different from the first notification, and including a second recommended action different from the first recommended action.

12. The method of claim 11, wherein the request to confirm functionality of the payment card device is received responsive to a failed attempt to process the transaction by the payment terminal, and wherein the second notification includes an indication that the payment card device is functioning as expected and the second recommended action includes a recommendation to reattempt the transaction at a different payment terminal.

13. The method of claim 8, wherein the one or more additional diagnostic tests include receiving card data from the payment card device and comparing the received card data to expected card data to identify a match.

14. The method of claim 8, wherein authenticating the user includes receiving an indication that the user is authenticated by a mobile application executing on the user computing device of the user.

15. One or more non-transitory computer-readable media storing instructions that, when executed by a computing platform comprising at least one processor, memory, and a communication interface, cause the computing platform to:
receive a request to confirm functionality of a payment card device to complete contactless payment transactions via a payment terminal;
responsive to receiving the request, authenticate a user associated with the request;
responsive to the user being authenticated, execute a diagnostic tool by a user computing device, executing the diagnostic tool including:
transmitting, via near-field communication, a signal to the payment card device to attempt to establish a connection between the user computing device of a user associated with the payment card device and the payment card device;
determining whether the attempt to establish the connection between the user computing device and the payment card device was successful;
responsive to determining that the attempt to establish the connection between the user computing device and the payment card device was not successful, generate a first notification including a first recommended action, wherein the first recommended action includes at least options for corrective action; and
responsive to determining that the attempt to establish the connection between the user computing device and the payment card device was successful, generate one or more additional diagnostic tests.

16. The one or more non-transitory computer-readable media of claim 15, wherein the payment card device is one of: a credit card or a debit card.

17. The one or more non-transitory computer-readable media of claim 15, wherein the one or more additional diagnostic tests include receiving keys loaded on the payment card device and confirming that the received keys correspond to expected keys to process a transaction.

18. The one or more non-transitory computer-readable media of claim 17, further including instructions that, when executed, cause the computing platform to:
generate a second notification, different from the first notification, and including a second recommended action different from the first recommended action.

19. The one or more non-transitory computer-readable media of claim 18, wherein the request to confirm functionality of the payment card device is received responsive to a failed attempt to process the transaction by the payment terminal, and wherein the second notification includes an indication that the payment card device is functioning as expected and the second recommended action includes a recommendation to reattempt the transaction at a different payment terminal.

20. The one or more non-transitory computer-readable media of claim 15, wherein authenticating the user includes receiving an indication that the user is authenticated by a mobile application executing on the user computing device of the user.

* * * * *